(12) United States Patent
Horvitz et al.

(10) Patent No.: US 7,673,088 B2
(45) Date of Patent: Mar. 2, 2010

(54) MULTI-TASKING INTERFERENCE MODEL

(75) Inventors: Eric J. Horvitz, Kirkland, WA (US);
Curtis G. Wong, Medina, WA (US);
Dale A. Sather, Seattle, WA (US);
Kenneth Reneris, Clyde Hill, WA (US);
Thaddeus C. Pritchett, Edmonds, WA (US); Talal A. Batrouny, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 11/771,524

(22) Filed: Jun. 29, 2007

(65) Prior Publication Data
US 2009/0006694 A1 Jan. 1, 2009

(51) Int. Cl.
*G06F 13/24* (2006.01)
(52) U.S. Cl. .................. 710/262; 710/260; 386/66
(58) Field of Classification Search ......... 710/260–269, 710/240–244; 386/66, 68, 83
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |

(Continued)

FOREIGN PATENT DOCUMENTS

WO 9800787 1/1998

OTHER PUBLICATIONS

Andy Harter, et al., A Distributed Location System for the Active Office, IEEE Network, 1994, pp. 62-70.

(Continued)

*Primary Examiner*—Mark Rinehart
*Assistant Examiner*—Kim T Huynh
(74) *Attorney, Agent, or Firm*—Lee & Hayes, PLLC

(57) ABSTRACT

The subject disclosure pertains to a multi-tasking interference system. A gatekeeper receives primary and secondary inputs, and a quantifier ascertains attention values associated with primary inputs and interruption values associated with secondary inputs. Attention values are ascertained based on attributes associated with primary inputs such as type or genre of media presentation, temporal location within media presentation, or a likelihood of impending commercials. Based on a comparison between attention values and interruption values the gatekeeper determines whether, when, and how to interrupt the primary input with the secondary input and accordingly thereafter interrupts the primary input with the secondary input based on the foregoing assessment.

20 Claims, 11 Drawing Sheets

U.S. PATENT DOCUMENTS

| | | |
|---|---|---|
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0154476 A1 | 8/2003 | Abbott, III et al. |
| 2005/0034078 A1 | 2/2005 | Abbott et al. |
| 2005/0102458 A1* | 5/2005 | Ober et al. .................. 710/260 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

| CATEGORY | DESCRIPTION | SCORE |
|---|---|---|
| GENRE | COMEDY | 36 |
| MEDIUM | TELEVISION | 69 |
| PARTICIPANTS | WILL FARRELL | 72 |
| VIEWING ENVIRONMENT | HOME TELEVISION | 28 |
| TIME OF DAY | 7:00 P.M. | 40 |
| COMPANY | NEIGHBOR | 30 |
| FREQUENCY OF EVENT | WEEKLY | 22 |
| RECORDING STATUS | RECORDING | 5 |

FIG. 3

| CATEGORY | DESCRIPTION | SCORE |
|---|---|---|
| IDENTITY | MOTHER | 85 |
| MEDIUM | TELEPHONE | 20 |
| LEVEL OF EMERGENCY | MEDIUM | 50 |
| PROJECTED DURATION | 10 MINUTES | 15 |
| TIME OF DAY | 7:00 P.M. | 60 |

FIG. 4

MULTI-TASKING INTERFERENCE MODEL

BACKGROUND

Technology has consistently sculpted the home entertainment experience from simple radio broadcasts of the past, to the most cutting edge high-definition digital programming of today. Most technological advances have focused on the type and quality of the stimulus; however, home entertainment is more than just a crisp picture or clear audio signals—it is an overall immersive environment. Having a clear picture or pristine sound is only the first step to a complete experience.

The increase in quality of media inputs has been accompanied by a proliferation of media sources. Whereas in the past there was little competition for attention; the television was perhaps the only source of media input in a home. Today there are many sources of input that compete for attention, and frequently the viewer is bombarded by multiple sources simultaneously, detracting from the entertainment experience. Between telephone, email, television, and the internet, it can be hard to focus on any one source and achieve a fully immersive entertainment experience.

Not all distractions are unwelcome but there is at present no way to judge an interruption until after it has pulled attention away from the entertainment at hand. Distractions and interruptions range from life-threateningly urgent, to insignificant annoyances. The former should, of course, be permitted to reach the viewer, and the latter suppressed.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure concerns a multi-tasking interference system. In one instance, the system receives and monitors a primary input which holds the user's direct attention. The system also monitors for any secondary inputs, and once a secondary input is detected, the system determines whether to interrupt the primary input with the secondary input. In accordance with an aspect of the innovation, the system calculates the attention value of the primary input and the interruption value of the secondary input, and makes a decision whether to interrupt the primary input based at least in part upon a comparison between the two values. An interruption generator then can package the interruption by altering characteristics of the interrupting secondary input such as the tone, volume, frequency, color, timing, etc. The interruption is then delivered to the user.

In accordance with another aspect, the calculation of the attention value and interruption value is based in part upon explicit and implicit user preferences. The attention value is dynamically refreshed as needed. A given primary input may change over the its course, and this way the system ensures that the attention value reflects the most current state of the primary input when compared with the interruption value of the secondary input. The user can specify certain secondary inputs as per se interrupters and certain primary inputs as per se do not interrupt. The user can further specify whether a per se interrupter takes precedence over a per se do not interrupt, vice-versa.

If and when a primary input is interrupted by a secondary input, and attention is shifted to the secondary input, the system continues to monitor new secondary inputs, which are then compared against the input currently holding the attention. In this manner, even interruptions are guarded against other interruptions to ensure a quality experience.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 3 is a block diagram of a quantifier for primary input, showing various categories, descriptions, and scores associated with the secondary inputs.

FIG. 4 is a block diagram of a quantifier for secondary input, showing various categories, descriptions, and scores associated with the secondary input.

DETAILED DESCRIPTION

Figure 1:
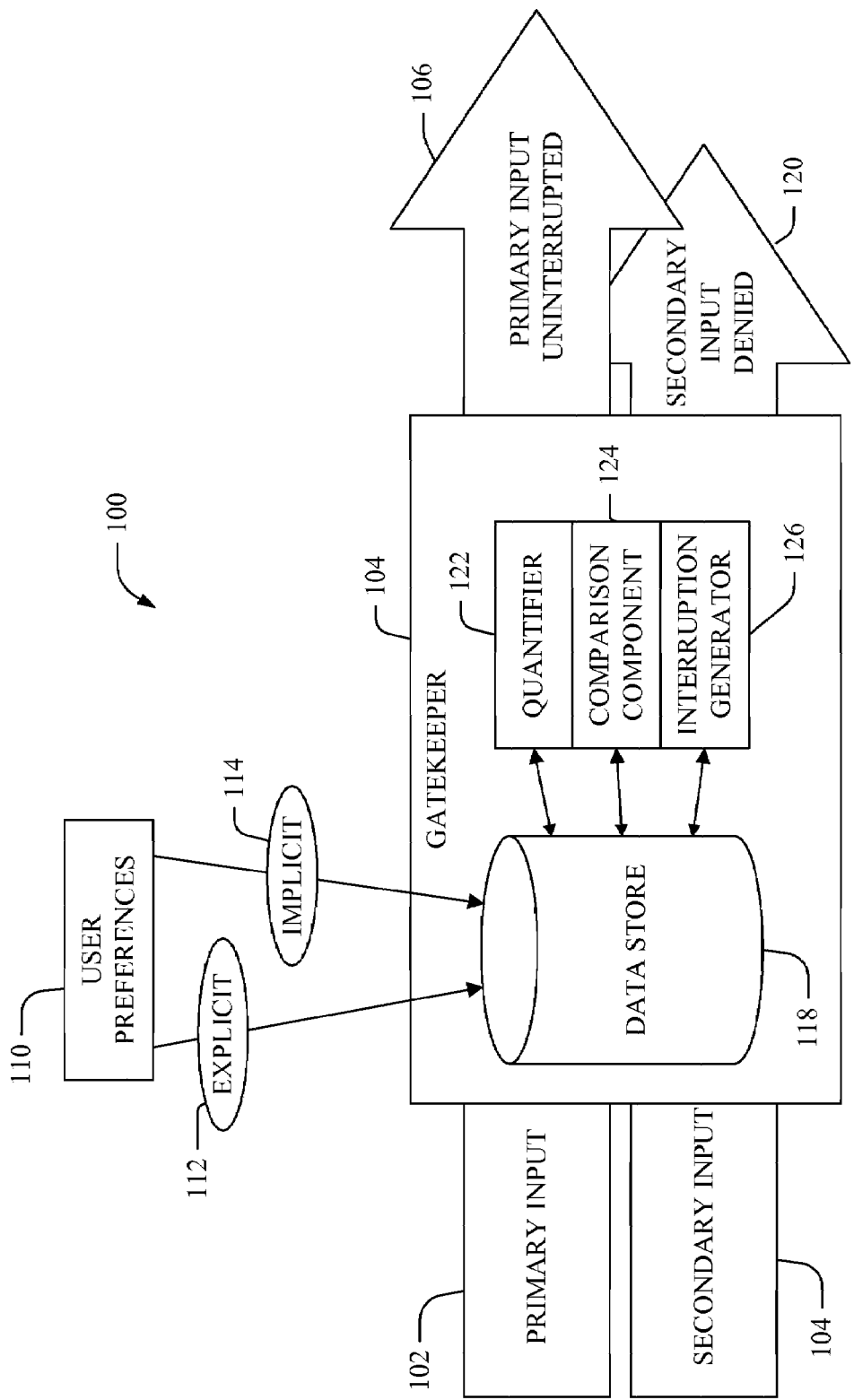
FIG. 1 is a block diagram of a multi-tasking interference system where a secondary input is suppressed in favor of a primary input.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component," "model," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

A multi-tasking interference system is provided to enhance an entertainment experience by filtering interruptions, and delivering desired interruptions in an optimal method, format, and at an opportune time. In one aspect, a gatekeeper receives a primary input (such as a television program) and a secondary input (such as a telephone call) and, based on user preferences, allows or disallows the secondary input to interrupt the primary input. In another aspect, once the system determines whether to interrupt the primary input, it further determines how to package and deliver the secondary input as an interruption. The packaging can comprise time shifting, volume adjustment, duration limits, intensity levels, means for delivering the interruption, and so forth.

Accordingly, for example, a media experience can be enhanced by guidance alerts as a function of nature of media being viewed, user state, user preferences, user tolerances, value of interruption, attention shift, cost of deferring an alert, priority of alerts, state or location within media being watched or heard, etc. Accordingly, numerous sets of extrinsic data (or inputs) are analyzed, determined, inferred, or predicted and evaluated and guided so as to optimize a media experience balanced against other entertainment (e.g., other available content) and non-entertainment factors (e.g., commercials, telephone calls, tasks, e-mail, text messages, other notifications, emergencies, doorbell, deliveries, appliance alerts (e.g., oven timer, washer/dryer).

It is to be appreciated that features described herein can be employed with televisions, computers, telephones, cell phones, automobile entertainment systems, other vehicle (e.g., boat, yacht, plane . . . ) entertainment systems, personal data assistants, stereo systems, radios, and other suitable platforms for conveying content to users. Moreover, although features and aspects described herein are primarily discussed in view of enriching user experience, it should be appreciated that $3^{rd}$ parties (e.g., advertisers, content providers, friends, service providers . . . ) can modify or tailor delivery of advertisements, content, services, communications, and the like in order to optimize for their own benefit (e.g., target ads at point of sale, increase likelihood that a user will switch to their content, enhance level of service, increase likelihood user will respond to an alert . . . ). Any suitable scheme (e.g., use of metadata, feedback control, machine learning systems, monitoring systems/services, profiling schemes, inter-parties collaboration, etc.) can be employed to facilitate achieving such end.

Referring initially to FIG. 1, an illustrative multi-tasking interference system 100 is shown. Primary input 102 can be any form of media presentation which a user participates in such as a television program, radio broadcast, podcast, etc. It is to be understood that the primary input 102 can be any form of media presentation, and specific examples given herein are for illustrative purposes and shall not limit the invention in any way. Also, the primary input need not be electronic media at all; rather, it may comprise family time, reading time, a party, a nap, etc. The system 100 can function in any appropriate environment in which a user views or otherwise consumes the primary input 102, including but not limited to at home, at work, in the car, on the telephone, etc.

The system 100 includes a gatekeeper 104 which monitors and delivers the primary input 102. During normal operation, the gatekeeper monitors and/or delivers the primary input uninterrupted 106. A secondary input 108 is also received by the gatekeeper 104. The secondary input 108 comprises generally any detectable event that may from time to time attempt to interrupt the primary input 102. Examples of secondary inputs 108 include, but are not limited to, telephone calls, instant messages, advertisements, doorbells, emails, etc. The designation of "primary" and "secondary" input is not necessarily a permanent one. The input that is currently receiving full attention is the primary input 102. If and when the primary input 102 is interrupted and attention is pulled to the secondary input 108, the secondary input 108 then becomes the primary input 102, at least temporarily, and the system performs the same analysis to determine whether to interrupt the current primary input 102 with any secondary input 108 that may occur. In this manner, the user is protected from the annoying situation of multiple, overlapping interruptions—further enhancing the entertainment experience.

The gatekeeper 104 can rely on several supporting technologies such as caller ID, television programming guides, online databases and so forth to provide rich data to assist the gatekeeper 104. Also, the gatekeeper can query the source of the interruption for information to further inform the gatekeeper 104. The gatekeeper 104 makes a determination whether to interrupt the primary input 102 based at least in part upon user preferences 110, both explicit 112 and implicit 114, or a combination of explicit 114 and implicit 116 preferences. The user preferences 110, among other data, is stored in a data store 118 and relates generally to user affinity (or lack thereof) toward a specific input. One purpose of the user preferences 110 is to judge what a specific user deems worthy of interrupting the primary input 102. The user can set broad preferences (either qualitative or numerical), and allow the gatekeeper 104 to make an inferential determination whether to interrupt the primary input 102 when a new secondary input 108 occurs.

By way of example, the primary input 102 can take the form of a television program. While viewing the television program, a user has indicated to the gatekeeper 104 that this program is particularly important to her. The secondary input 108 may be a telephone call from the user's mother. The gatekeeper 104 can receive data from a caller ID system to provide the identity of the caller, and given the high interest assigned to the television program, it is unlikely that an interruption will be delivered. Thus, the gatekeeper 104 takes the information and decides whether to allow the phone to ring and interrupt the television program, or to suppress the telephone call and preserve the integrity of the entertainment experience. The gatekeeper 104 uses a quantifier 122 to make this determination by quantifying the value of the primary input 102 and the secondary input 108 based at least in part upon the user preferences 130. The values are then passed to a comparison component 124 where they are compared and the determination is made. The interruption generator 126 then assembles and delivers the interruption. The operation of the quantifier 122, the comparison component 124, and the interruption generator 126 is given in more detail below. As shown in FIG. 1, the secondary input has been denied 120 and the uninterrupted primary input 106 proceeds.

Figure 2:
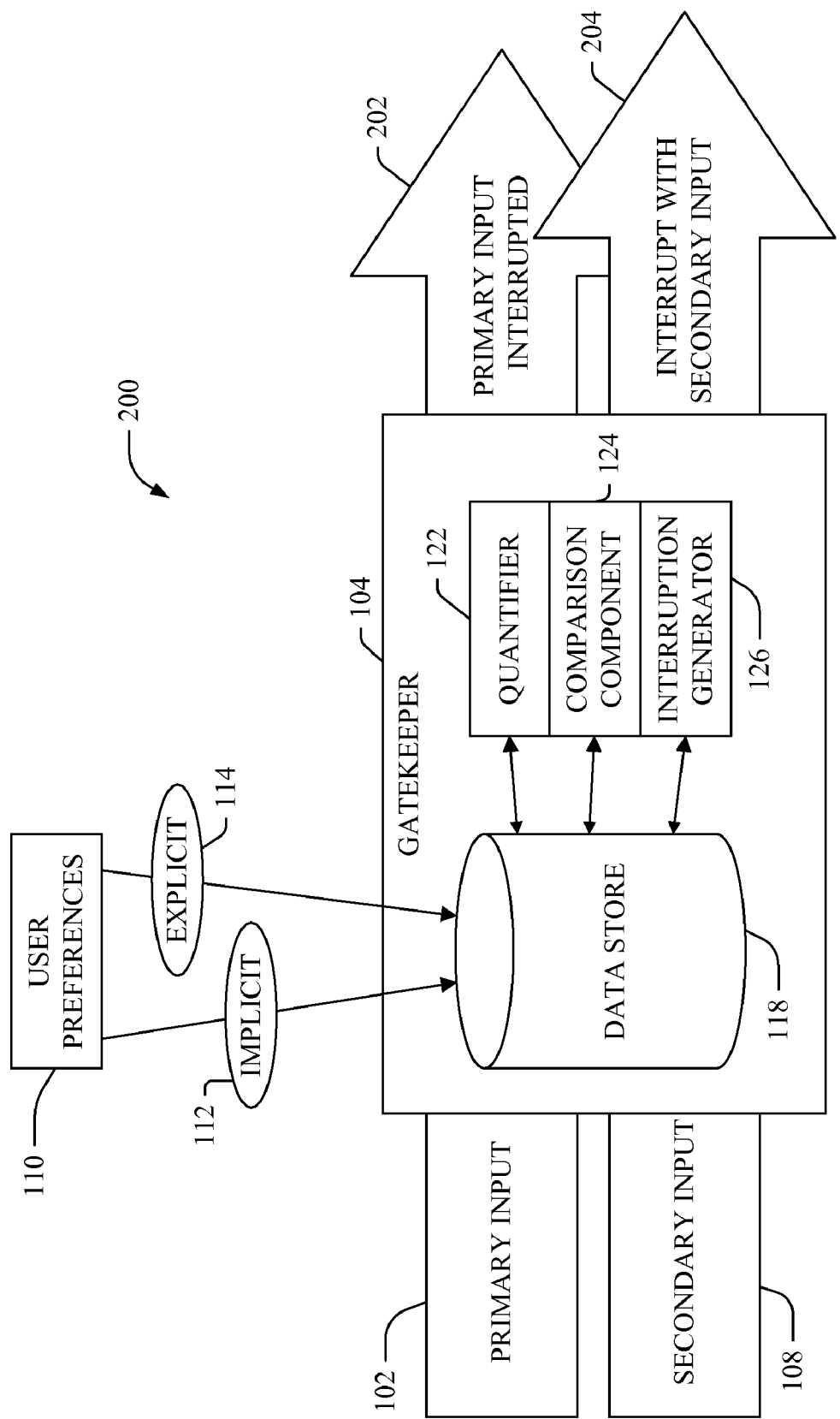
FIG. 2 is a block diagram of a multi-tasking interference system where a secondary input is allowed to interrupt a primary input.

FIG. 2 shows another illustrative aspect 200, featuring similar components to those shown in FIG. 1, only this time the secondary input 108 interrupts the primary input 102. Continuing the example of the television program from above, now assume the user has previously indicated that she was expecting her mother to call about an important matter, so a relatively high value can be assigned to the call. Thus, the primary input is interrupted 202 and the secondary input is delivered 204. The interruption generator 126 delivers the interruption in either its raw form, or packaged with respect to form, method and timing, etc. The raw format of the interrupting secondary input 204 would be to simply allow the telephone to ring, where a packaged delivery can include altering the ringer volume, pitch, pattern, etc. or by delaying the ringing altogether, or by prompting the caller to leave a message. Packaging can also comprise altering the means of delivery, by transferring a telephone call into an on-screen message, displayed on the television screen.

Turning now to FIG. 3, an illustrative embodiment 300 of the quantifier 122 are shown. The quantifier 122 receives primary input metadata which describes the primary input 102. As shown, the primary input 102 can be described by a listing of categories 302, each containing a description 304 and assigned a score 306. It is to be appreciated that the categories, descriptions, and scores will vary widely depending on the type of primary or secondary input, and that the categories (and number of categories), descriptions, and scores shown in FIG. 3 are for illustration purposes only, and do not limit the present invention in any way. In the example primary input shown, the category genre 308 relates to the content of the primary input 102, and the description is comedy. The user has specified that her preference for comedy is "36." The user can make this preference explicitly by directly assigning the score "36" to comedy, or the input can be implicitly gathered from monitoring the user's viewing habits, for example. The score 306 relates to the user's affinity for the content, or her distaste for interruptions—the higher the score, the less likely it is that an interruption will be delivered. These preferences and scores may fluctuate during the primary input 102 as illustrated by a televised sporting event where the first and second quarters are of relatively insignificant importance compared to the fourth quarter and overtime. The system can re-calculate these values as needed to compare to a occurrence of a secondary input 108.

The next category, medium 310, relates to the medium through which the user consumes the content. Descriptions are media such as radio, internet, television, telephone, etc. In this example, the medium is television, and it has received a relatively high score of "69," indicating that the threshold for interrupting this user while watching television is high. Participants 312 relates to actors, writers, directors, narrators, or any other personnel involved in the content. Here, the user has a high affinity for content in which Will Farrell participates. The present invention encompasses a virtually unlimited level of specificity for any of these categories; a user can specify a preference for Will Farrell as an actor, but not as a director, for example. Viewing Environment 314 relates to the location of the primary input 102, and as such is related to but more specific than medium 138. For example, watching a television program on a large screen television is a different experience than on a smaller television in the kitchen, and therefore the user will likely have different tolerances for interruption in the two environments. Time of Day 316 allows the user to personally define "prime time." Company 318 describes with whom, if anyone, the user is sharing the experience. This can be determined by explicit entry by the user, or sensed by known technologies; optically, by motion sensors, by detecting body heat, or the presence of personal electronic devices such as cell phones and the like. Frequency of Event 320 permits the user to express preferences for programs that run weekly, annually, one-time events, and so forth. Typically, a one-time event will hold merit more attention than more frequent events. Another category, Recording Status 322, describes whether the primary input 102 is being recorded, and whether features such as pause, rewind, and fast forward are available. This category can also track the buffer size in the recorder to measure what quantity of the program has been recorded (how long until "live"). If the user can pause the television program, there will usually be a higher tolerance for interruptions, and a low value for this category will be factored into the end result. However, the system can accept any score entered by the user to fit personal preferences.

Referring now to FIG. 4, an illustrative embodiment 400 is shown, describing the operation of secondary input metadata. The secondary input 108 is analyzed by the quantifier 122 in a similar manner to create secondary input metadata, albeit with different categories chosen to suit the nature of the input. Identity 402 refers to the initiator of the secondary input 108. In the example of the telephone call, the description 304 would be "mother," with a corresponding score 306 of "85" indicating the high priority associated with the call. Identity 402 is not limited to inputs with a human operator behind them, however. The subject disclosure envisions a case where the initiator of secondary input 108 is not a person, but anything that can be monitored and measured. For example, a dishwasher or other household appliance can initiate secondary input 108 to announce that the dishes are clean, in which case the description 304 of Identity 402 would be "dishwasher." The category medium 404 refers to the type of equipment or technology that conveys the secondary input 108, such as a telephone, doorbell, etc. Different users may have different preferences and tolerances for interruptions by different media, and this preference is reflected in the score assigned to this category 302. Also important is the category Level of Emergency 406, which can ensure that the user does not miss an urgent message. A call from the hospital or from a police station can be delivered immediately, while non-emergency calls and interruptions will take less precedence. Projected Duration 408 refers to the estimated amount of time that the interruption posed by the secondary input 108 will last. Another, more self explanatory, category 302 is Time of Day 410. This category 130 allows the user to dictate that some time during which interruptions are unwelcome. The foregoing list of categories, descriptions, and scores is exemplary, and in no way limits the scope of the subject disclosure. Any relevant category may be used, and the number and content of the categories, descriptions, and scores can be determined by the described system, or by the user, or by a combination of the system and the user.

Figure 5:
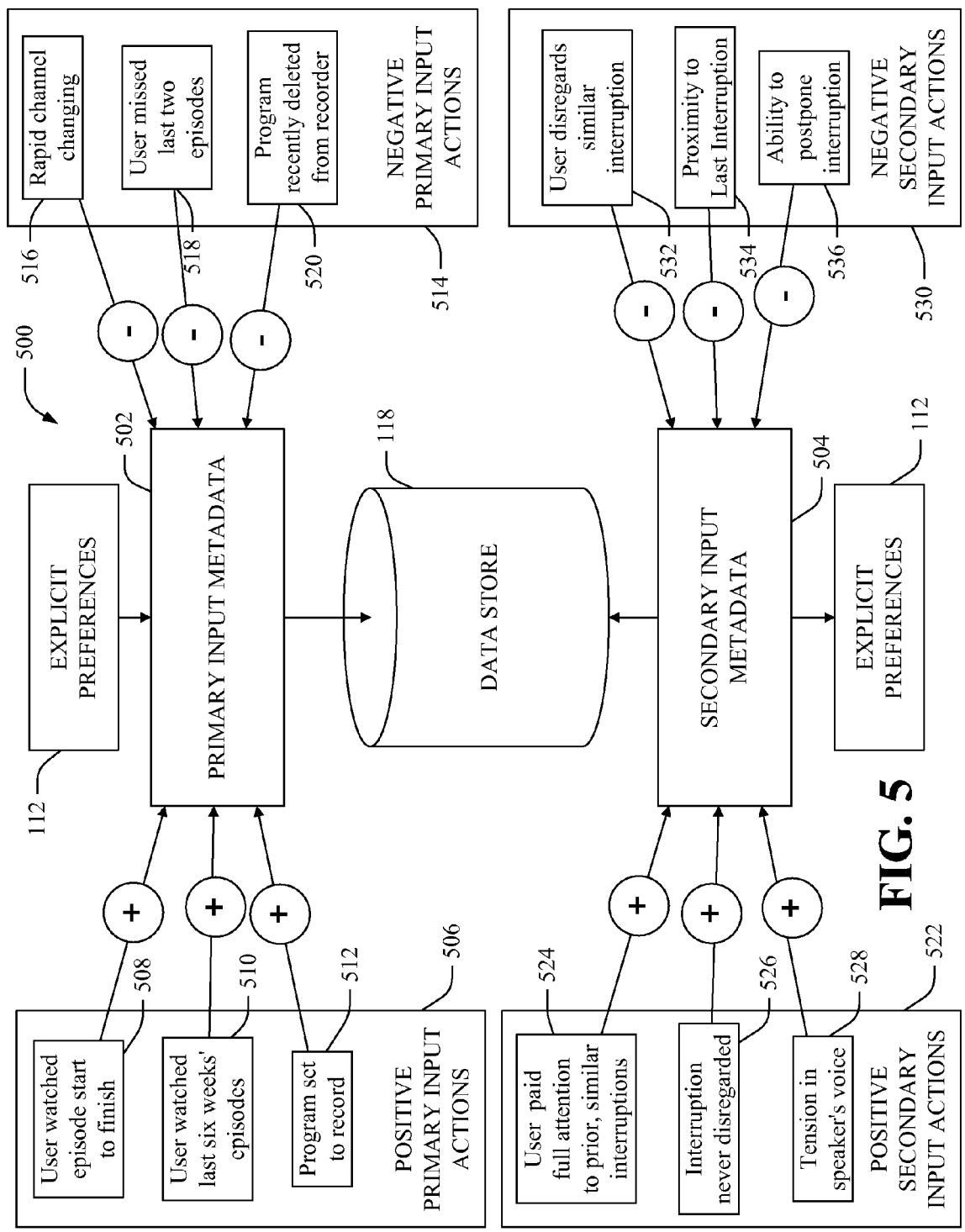
FIG. 5 is a block diagram of implicit user input, both positive and negative.

FIG. 5 illustrates the operation 500 of the explicit preferences 112 and implicit preferences 114, in one embodiment. The user dictates explicit preferences 112 directly by instructing the system 100 how to value primary input 102 and secondary input 108. In one embodiment, the user assigns a score 306 to various categories 302 for both the primary input 102 and secondary input 108. The score 306 can take any appropriate form, ranging from broad preference for a certain type or genre of input, to more specific numeric or qualitative assignments for each category 302. The explicit preferences 112 are then attached to the primary input metadata 502 and secondary input metadata 504, and stored in the data store 118.

Implicit user preferences 114 are gathered by the system 100 by observing user actions and habits. Actions taken by the user can reflect positively or negatively on the primary input 102 and/or the secondary input 108, providing an implicit measure of user preference for or against the input. The actions are gathered by the system 100 and used to increase or decrease the score 306 for the input. Continuing the example of the television program as the primary input 102 and a telephone call as secondary input 108 from above, positive primary input actions 506 can include watching the entire episode from start to finish 508; watching the program each time it airs for an extended time 510; and setting a personal video recorder to record the program 512. On the other hand, negative primary input actions 514 can be changing the channel rapidly 516; missing episodes 518; and deleting recorded episodes 520. Positive secondary input actions 522 function similarly, with the type of actions selected to fit the nature of the secondary input 108. Examples include paying full attention to prior, similar interruptions 524; never ignoring similar interruptions 526; and tension or urgency in the speaker's voice 528. These actions indicate a higher probability that the user will accept an interruption. Negative secondary input actions 530 can include disregarding similar interruptions 532; whether the primary input 102 has been interrupted recently 534; and the ability to postpone the interruption 536 (e.g., by voicemail). The foregoing list of actions is illustrative of the type of actions likely to bear on the user's preferences for or against an interruption. The list is not exhaustive and should not limit the system to the listed actions in any way. Further, a given action is not necessarily negative or positive—the system 100 is sensitive to user preferences, in part because actions considered positive by one user may be considered negative by another.

The user may dictate certain secondary inputs 108 as per se interrupters, and certain primary inputs 102 as per se do not interrupt. These are secondary inputs 108 that should never be suppressed, and primary inputs 102 that should never be interrupted, respectively. For example, if the secondary input 108 is a call from the hospital that the user's wife is in labor, it should interrupt all primary inputs 102. Similarly, during overtime of a basketball game, the telephone should never be allowed to ring. The quantifier 122 can handle per se interrupters and per se do not interrupt input either by assigning an exceedingly large score 306 to the primary input metadata 502 or secondary input metadata 504, or by lowering other scores 306, or by overriding the scores 306 altogether. The user can dictate whether a per se interrupter will proceed if it happens during a per se do not interrupt, and vice-versa. Alternatively, the conflict can be determined implicitly as with implicit user preferences 114.

Figure 6:
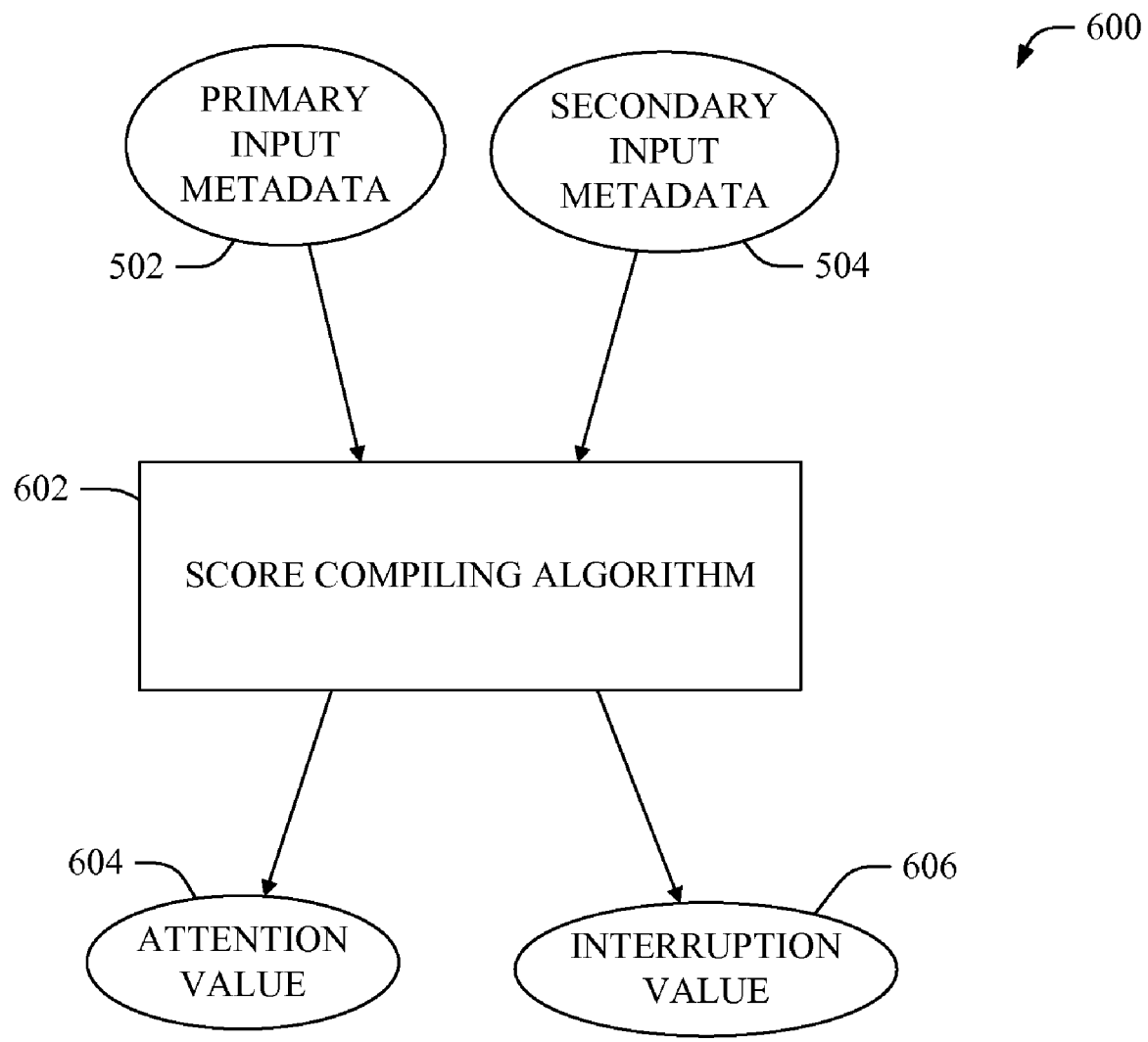
FIG. 6 is a block diagram of detailed operation of the quantifier and the score compiling algorithm.

Now turning to FIG. 6, an illustrative operation 600 of how the scores 306 are combined is shown. Once the primary input metadata 502 and secondary input metadata 504 are complied, the quantifier 122 then combines the scores 306 using a score compiling algorithm 602 to obtain an attention value 604 and an interruption value 606, pertaining to the primary input metadata 502 and the secondary input metadata 504, respectively. The most simple score compiling algorithm 602 is to average them; however, the algorithm 602 may be any mathematical formula used to produce the attention value 604 and interruption value 606. The scores 306 may be weighted, for example.

Figure 7:
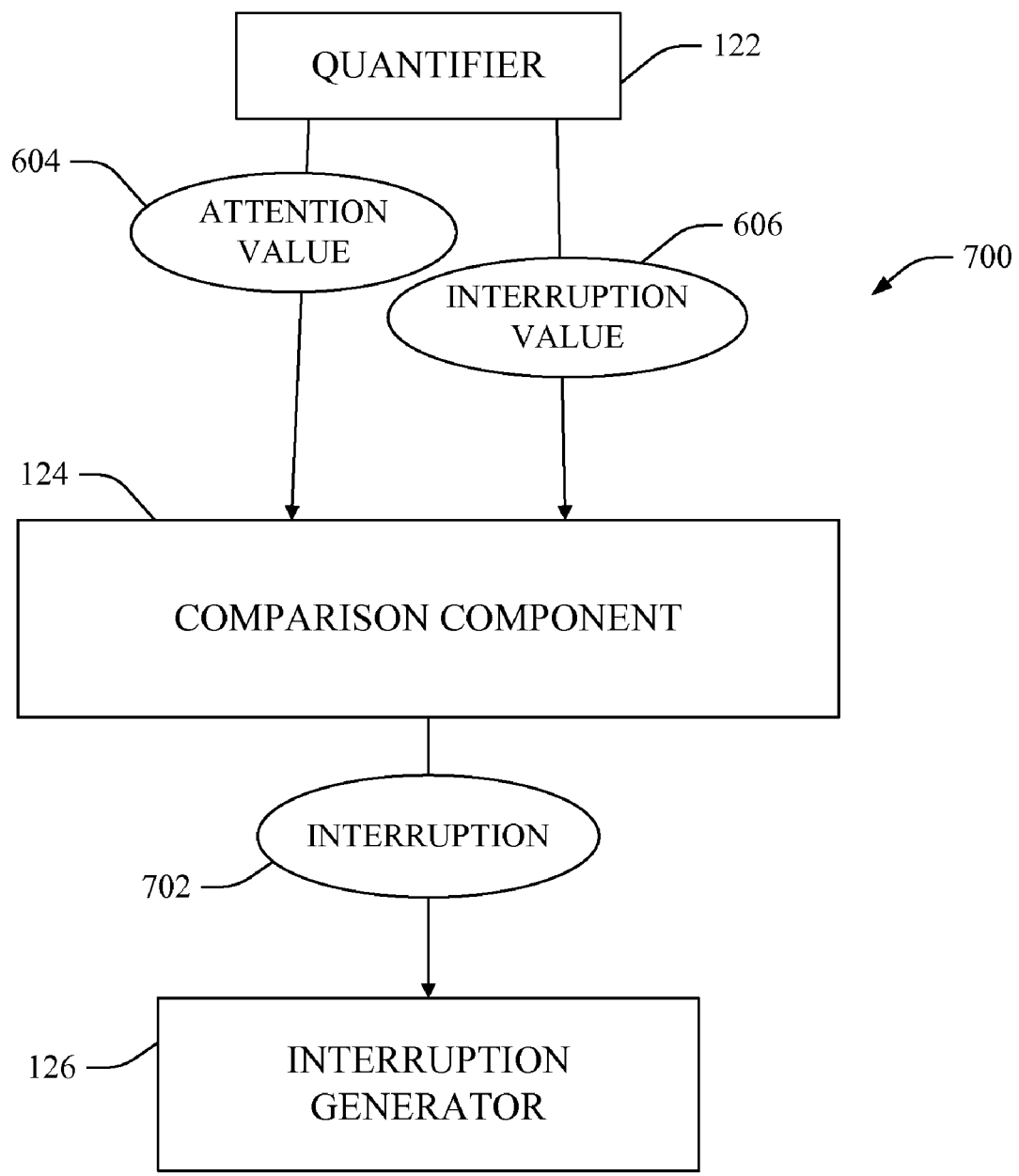
FIG. 7 is a block diagram of the quantifier, comparison component, and interruption generator.

Next in FIG. 7, the quantifier 122 passes the attention value 604 and the interruption value 606 to the comparison component 124, which makes a threshold determination whether to interrupt the primary input 102 with the secondary input 108. The determination can be made using any appropriate mathematical combination of the attention value 604 and interruption value 606, and can simply to subtract the two values, or a more elaborate algorithm. If the difference is above a threshold value, the interruption 702 and corresponding metadata will proceed to the interruption generator 126 to package and deliver the interruption 702. If the interruption value 606 is not above the threshold, the secondary input 108 will be suppressed and no interruption 702 will issue.

In a related aspect artificial intelligence (AI) components can be employed to facilitate determining whether to interrupt a primary input 102 with a secondary input 108, and/or decide the manner to deliver the interruption, as disclosed in the subject innovation. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
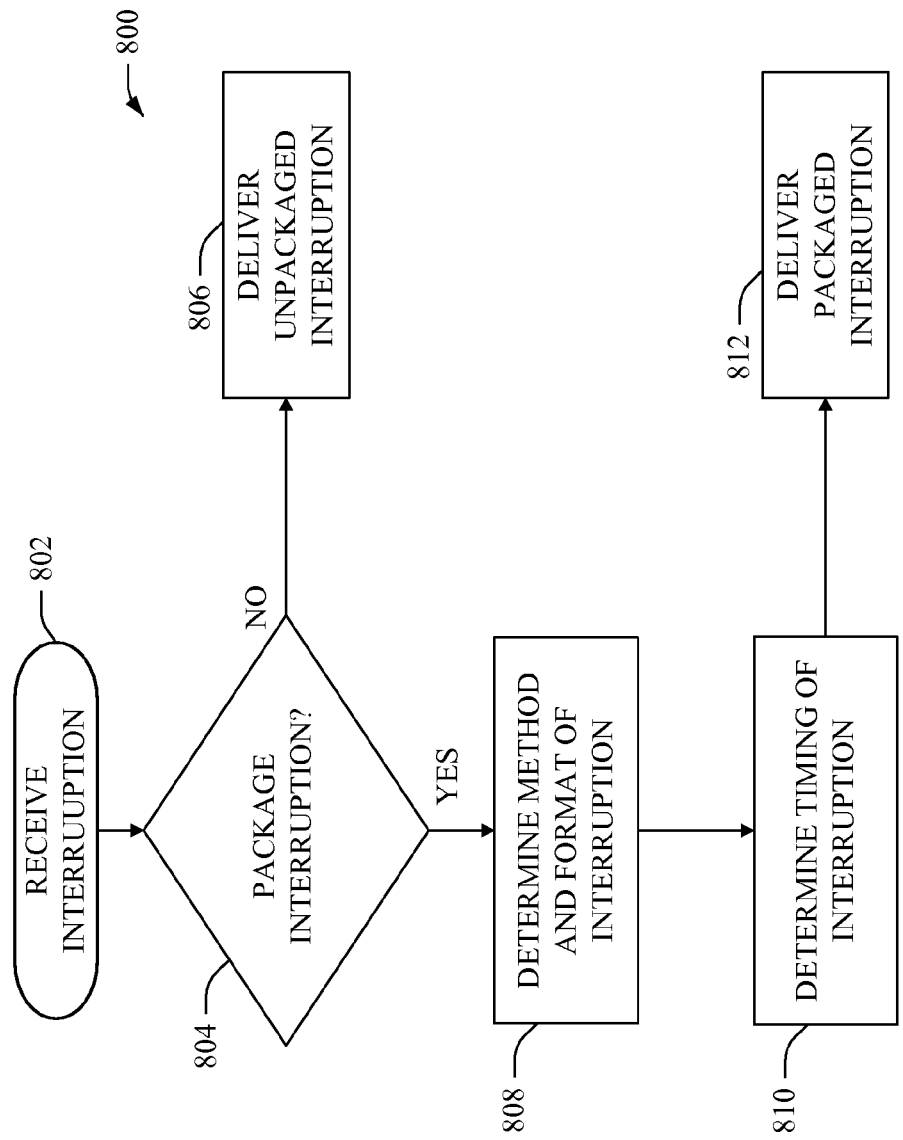
FIG. 8 is a flow chart diagram of the interruption generator methodology that packages and delivers an interruption.
Figure 9:
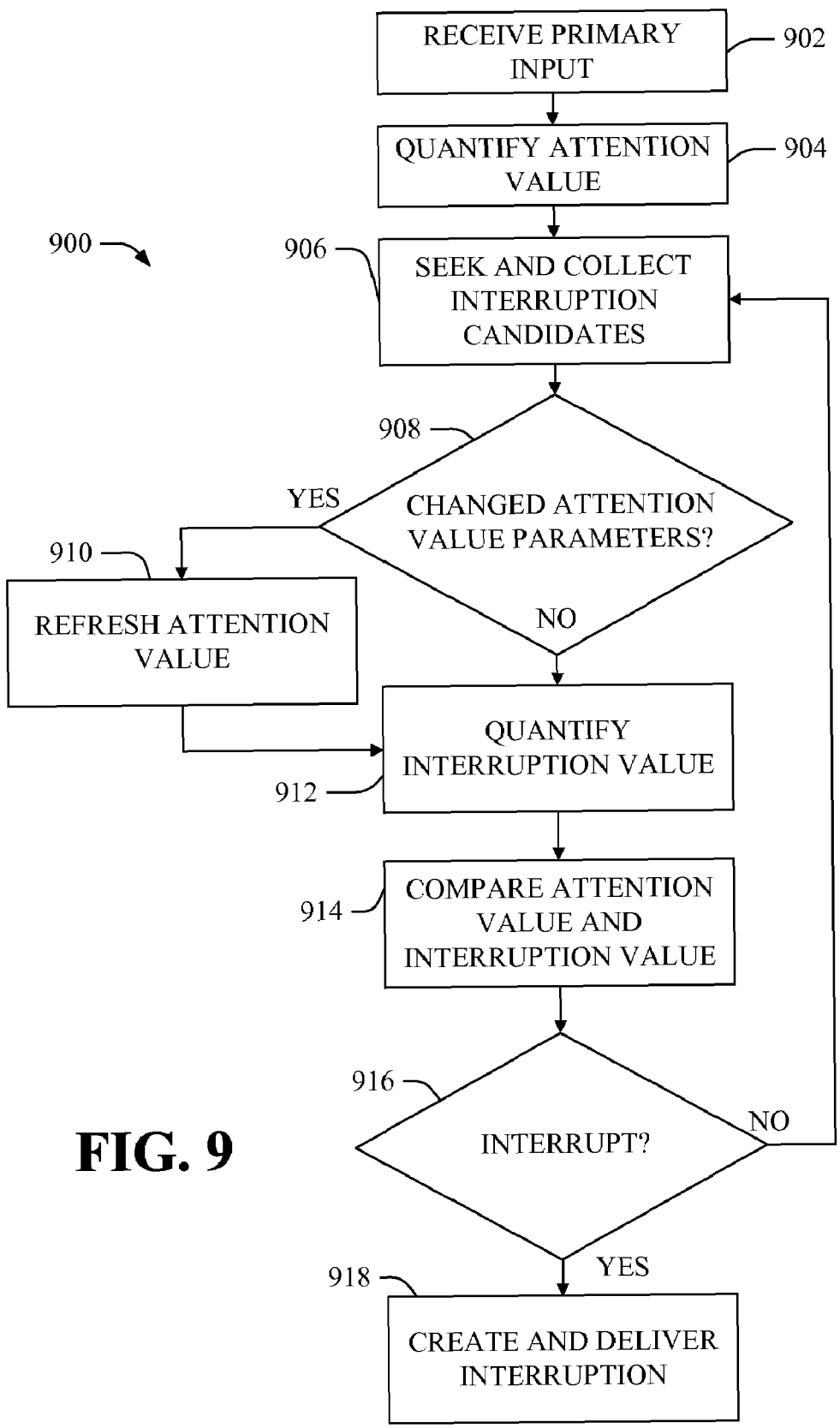
FIG. 9 is a flow chart diagram of a method filtering interruptions to enhance the primary input.

In view of the illustrative systems described supra, methodologies that may be implemented in accordance with the disclosed subject matter will be better appreciated with reference to the flow charts of FIGS. 8 and 9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 illustrates a methodology 800 of the interruption generator 126 according to one aspect of the subject disclosure. The interruption 702 is received at reference numeral 802 from the comparison component 124 and analyzed to determine whether to package the interruption at reference numeral 804. The decision is made based on the primary input metadata 502, the secondary input metadata 504, the interruption value 606, and the attention value 604. If no packaging is appropriate, the interruption 702 is delivered as is, at reference numeral 806. Packaging can either dull the interruption 702 if the interruption value is low, or intensify the interruption 702 if the interruption value 606 is high. The interruption generator 126 determines the method and format of the interruption at reference numeral 808. The method and format depend upon the type of primary input 102, and other factors contained in the primary input metadata 502 and secondary input metadata 504. For example, if the primary input 102 is an online video watched on a computer, an interrupting telephone call can be represented on the computer screen in large obtrusive letters and symbols if the call is urgent, and if less urgent a voicemail message can be taken which will remain on the telephone. The interruption generator 126 also determines the timing of an interruption at reference numeral 810. The urgent interruptions will perhaps be delivered immediately, the lesser important interruptions during commercial breaks, and the unimportant interruptions postponed until after the primary input 102 terminates. Once the packaging is complete, including method, format, and timing of the interruption, the packaged interruption is delivered at reference numeral 812. In the case of per se interrupters, the packaging can be to abruptly shut off the primary input 102 and demand full attention be given to the secondary input 108, and per se do not interrupt input can completely suppress the interruption.

FIG. 9 shows an example methodology 900 for the multitasking interference model in accordance with an aspect of the subject disclosure. A primary input is received at reference numeral 902. The primary input can be any type of media program or content in which the user is primarily engaged, such as a television program, a movie, etc. At reference numeral 904, the primary input is analyzed and assigned an attention value representative of the user's affinity for the input. The higher the attention value, the less the user desires to be interrupted. At reference numeral 906, the system seeks and collects secondary input interruption candidates such as telephone calls, emails, and any other detectable interruption. Once an interruption candidate occurs, at numeral 908 the system queries whether the attention value parameters have changed, and if so, the primary input attention value is refreshed at numeral 910. At reference numeral 912, the secondary input is quantified according to the importance or urgency of the interruption candidate. At reference numeral 914, the attention value and interruption value are compared, and a determination whether to interrupt is made at reference numeral 916. If not, the system reverts back to seeking and collecting interruption candidates as shown at reference numeral 906. If an interruption is to be delivered, the information is passed on for creation and delivery at reference numeral 918.

Figure 10:
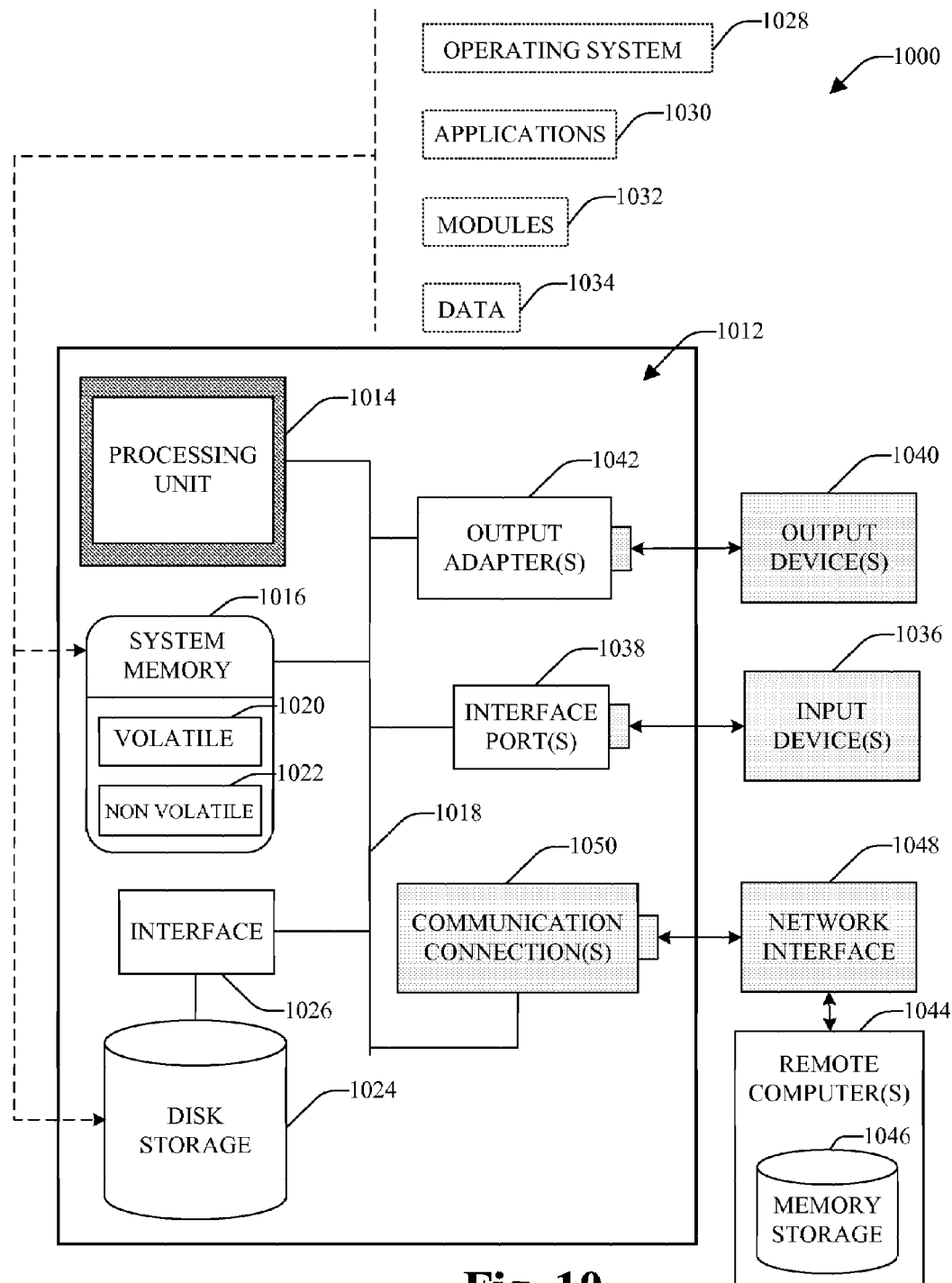
FIG. 10 is a schematic block diagram illustrating a suitable operating environment.
Figure 11:
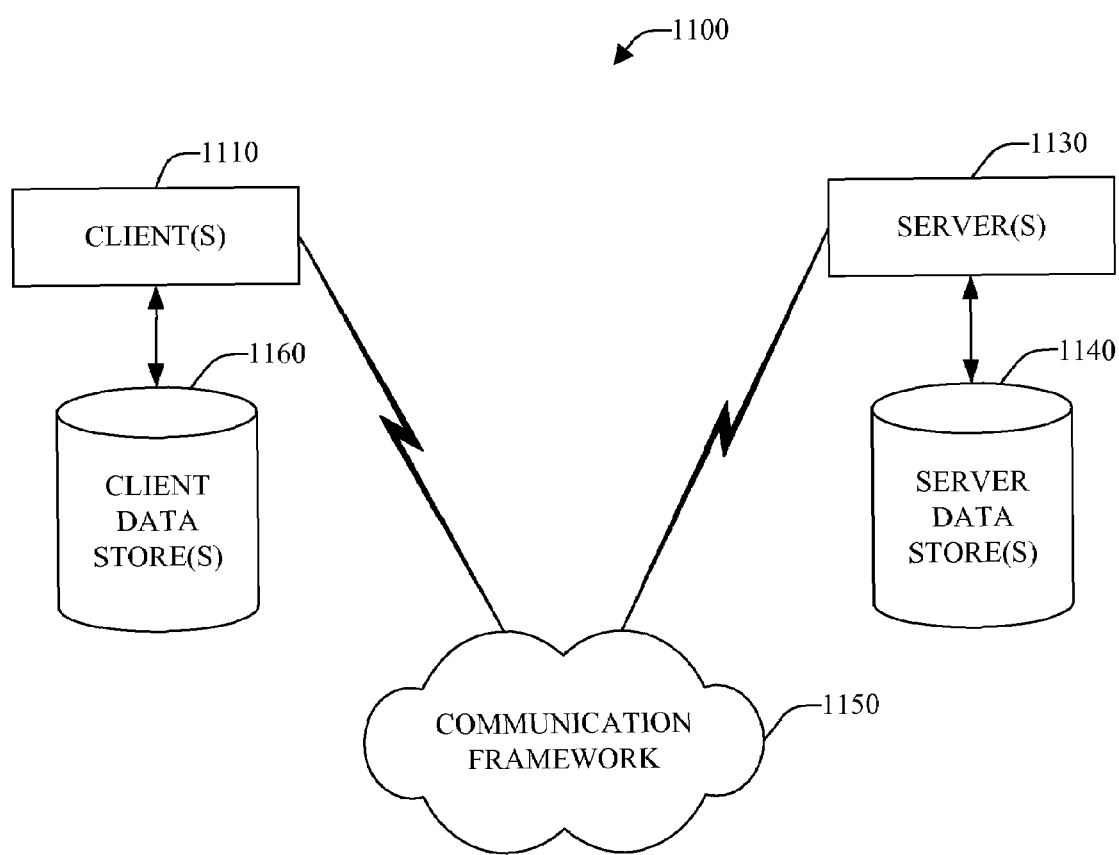
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1000 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel and CRT), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1330. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A multi-tasking interference system, comprising:
   a processing unit configured by computer-executable instructions to implement the multi-tasking interference system;
   a gatekeeper that receives a primary input comprising a media presentation and a secondary input comprising a detectable event, the gatekeeper comprising a data store and implemented as at least a part of the multi-tasking interference system;

a quantifier that ascertains an attention value associated with the primary input, and an interruption value associated with the secondary input, wherein the attention value is ascertained based at least on an attribute associated with the primary input, wherein the attribute comprises at least one of: a category, a description, or a user preference score related to a user affinity for the primary input or a user distaste for interruptions; and the gatekeeper determines whether to interrupt the primary input with the secondary input based at least upon:
a comparison between the attention value and the interruption value, wherein the attention value fluctuates with fluctuations in the user preference score; and
user preferences.

2. The system of claim 1, wherein the attention value and interruption value are determined based at least upon explicit user preferences and implicit user preferences.

3. The system of claim 1, further comprising an interruption generator that generates an interruption by altering characteristics of at least one of the secondary input or the primary input.

4. The system of claim 3, wherein the interruption generator alters at least one of the secondary input or the primary input by at least one of delaying delivery, altering duration, altering the means of delivery, altering volume, or altering appearance.

5. The system of claim 1, wherein the secondary input comprises any detectable distraction from the media presentation.

6. The system of claim 1, wherein the quantifier determines an initial attention value, and refreshes the attention value upon receiving the secondary input.

7. The system of claim 1, wherein during a presentation of the interrupting secondary input, the gatekeeper receives and filters newly arising secondary inputs.

8. The system of claim 2, wherein the explicit user preferences comprise the user preference score assigned to at least one of the primary input or the secondary input.

9. The system of claim 8, wherein the user preference score comprises a plurality of numerical values applied to a plurality of categories that describe the input.

10. The system of claim 2, wherein the implicit user preference score comprises inferences made by monitoring actions taken by a user.

11. The system of claim 1, wherein the attribute associated with the primary input comprises at least one of: type of media presentation, genre of media presentation, an ascertained temporal location within a media presentation, or a probabilistically determined likelihood of an impending commercial based on the type of media presentation.

12. The system of claim 11, wherein the type of media presentation includes recorded presentations, live presentations, educational presentations, or sporting events.

13. A processor-implemented method for filtering interruptions, comprising:
filtering the interruptions under control of one or more processors via operations including:
receiving a primary input;
obtaining a secondary input;
creating secondary input metadata categories, the secondary input metadata categories comprising at least one of:
identity, wherein identity refers to an initiator of the secondary input;
medium, wherein medium refers to a technology by which secondary input is conveyed;
level of emergency;
projected duration, wherein projected duration refers to an estimated time that the secondary input will last; or
time of day;
determining an attention value from the primary input;
ascertaining an interruption value from the secondary input and
secondary input metadata categories; and
comparing the attention value to the interruption value and determining whether to interrupt the primary input with the secondary input based at least in part upon the comparison.

14. The method of claim 13, further comprising receiving at least one of explicit user preferences or implicit user preferences.

15. The method of claim 13, wherein the attention value and interruption value are based, at least in part, upon user preferences.

16. The method of claim 13, further comprising creating an interruption by altering at least one characteristic of at least one of the secondary input or the primary input.

17. The method of claim 16, wherein the altered characteristic comprise at least one of: time of delivery, duration, volume, appearance, or frequency.

18. The method of claim 13, further comprising receiving a new secondary input during an interruption created from an earlier secondary input.

19. The method of claim 13, further comprising interrupting the primary input with the secondary input if the secondary input is marked as a per se interrupter.

20. A computer readable storage medium having computer executable instructions encoded thereon, the computer executable instructions upon execution configuring a processor to perform operations comprising:
receiving a primary input comprising a media presentation;
receiving a secondary input comprising a detectable event;
creating secondary input metadata categories, the secondary input metadata categories comprising at least one of:
identity, wherein identity refers to an initiator of the secondary input;
medium, wherein medium refers to a technology by which secondary input is conveyed;
level of emergency;
projected duration, wherein projected duration refers to an estimated time that the secondary input will last; or
time of day;
assessing an attention value for the primary input, wherein the attention value is assessed based at least in part on an attribute associated with the primary input, wherein the attribute comprises at least one of: a category, a description, or a user preference score related to a user affinity for the primary input or a user distaste for interruptions;
ascertaining an interruption value for the secondary input and secondary input metadata categories; and
determining whether, when, and how to interrupt the primary input with the secondary input based at least in part on the attention value and the interruption value.

* * * * *